United States Patent [19]

Hope

[11] 4,427,388
[45] Jan. 24, 1984

[54] YOKE MOVER

[75] Inventor: Dana R. Hope, Enon, Ohio

[73] Assignee: The United States of America as represented by the Secretary of the Air Force, Washington, D.C.

[21] Appl. No.: 407,220

[22] Filed: Aug. 11, 1982

[51] Int. Cl.³ ............................................. G09B 9/08
[52] U.S. Cl. ..................................... 434/45; 336/30; 434/51
[58] Field of Search ...................... 434/45, 51; 336/30

[56] References Cited

U.S. PATENT DOCUMENTS

| | | | |
|---|---|---|---|
| 3,024,539 | 3/1962 | Rider | 434/45 |
| 3,493,906 | 2/1970 | Zetterberg | 336/30 |
| 3,496,651 | 2/1970 | Briguglio et al. | 434/45 |
| 3,601,733 | 8/1971 | Kazmarek | 336/30 |
| 4,227,319 | 10/1980 | Guy et al. | 434/45 |
| 4,236,325 | 12/1980 | Hall et al. | 434/45 |

Primary Examiner—William H. Grieb
Attorney, Agent, or Firm—Donald J. Singer; Bobby D. Scearce

[57] ABSTRACT

A servomechanical controller for inputting prerecorded flight data to an aircraft flight simulator is provided which comprises a pair of servomotors operatively interconnected to a single output shaft connected to the flight simulator control wheel, one motor controlling simulated pitch to the wheel by imparting axial movement to the shaft, and the other motor controlling simulated roll by imparting rotation to the shaft, transducer means for sensing both angular and axial position of the shaft, and a force sensor for sensing torque and axial load on the shaft. The controller is configured for accepting analog or digital prerecorded electronic command inputs and translating those inputs to the flight simulator.

2 Claims, 4 Drawing Figures

YOKE MOVER

RIGHTS OF THE GOVERNMENT

The invention described herein may be manufactured and used by or for the Government of the United States for all governmental purposes without the payment of any royalty.

BACKGROUND OF THE INVENTION

This invention relates generally to the field of aircraft flight control mechanisms, and more particularly to a novel servo-mechanical controller for the testing, evaluation and adjustment of aircraft flight simulators.

The use of flight simulators for aircraft pilot and crew training has found increasingly substantial use in recent years which may variously be attributed to the increased complexity of aircraft control systems and rising costs of aircraft and aviation fuel. Further, reliable flight simulation systems for military flight training in many respects are significantly more diverse and complex than those associated with commercial flight training. In the development of a reliable, fully integrated flight simulator, provisions should be made to simulate not only the basic airframe flight dynamics associated with the fundamental principles of aircraft control, but the simulator should also duplicate as closely as possible the lesser definable parameters associated with a pilot's physiological reaction or response to the aircraft controls, cockpit motion, and visual displays or signals, i.e., the total range of "feel" of the aircraft controls and instrumentation. Desirably true simulation systems therefore necessarily include provisions for providing appropriate cues in response to a pilot's control inputs during a flight simulation program. The simulator must accurately produce cues which are time and amplitude correlated with aircraft control movements and dynamics and with other cues produced in order for the simulator to "feel" right to the simulator pilot.

An instrumented system which may quantitatively measure, record and reproduce the input parameters associated with simulator control is not possible unless the simulator may be "flown" under the same conditions and with substantially the same control inputs as the test airplane from which the input parameters were taken. Even experienced pilots, however familiar with the aircraft for which simulation is required, do not satisfactory provide the controlled, standardized inputs necessary to properly program the flight simulator. The need exists, additionally, for a control mover capable of receiving prerecorded electronically stored aircraft flight profile data and reproducibly translating those inputs to the simulator controls.

The yoke mover of the present invention provides a novel servo-mechanical controller which inputs prerecorded commands to a wheel/column type flight simulator. The controller is capable of three-axis dynamic control in either a position or force mode, in reproducibly translating to the simulator the aircraft control inputs recorded during actual flight conditions of the aircraft to be simulated. The controller is capable of repeating prerecorded control data with much greater precision than a trained pilot, for the evaluation, and adjustment of a flight simulator, or for the comparison of different simulators. The controller of the present invention may be configured to be driven by an analog or digital signal provided by a signal generator, computer, simulator or aircraft flight recorder, or the like. Since the controller may be fed by a recorded signal, its movements may be precisely reproduced repetitively. It is therefore useful in the testing, evaluation, adjustment and certification of flight simulators.

It is, therefore, an object of the present invention to provide a reliable mechanical controller for aircraft flight simulators.

It is a further object of the invention to provide a servo-mechanical controller for aircraft flight simulators for accurately and reproducibly inputting flight data to the simulators.

It is yet another object of the present invention to provide an improved flight simulator.

These and other objects of the present invention will become apparent as the detailed description of certain representative embodiments thereof proceeds.

SUMMARY OF THE INVENTION

In accordance with the foregoing principles and objects of the present invention, a servo-mechanical controller for inputting prerecorded flight data to an aircraft flight simulator is provided which comprises a pair of servo-motors operatively interconnected to a single output shaft connected to the flight simulator control wheel, one motor controlling simulated pitch to the wheel by imparting axial movement to the shaft, and the other motor controlling simulated roll by imparting rotation to the shaft, transducer means for sensing both angular and axial position of the shaft, and a force sensor for sensing torque and axial load on the shaft. The controller is configured for accepting analog or digital prerecorded electronic control inputs and translating those inputs to the flight simulator.

DESCRIPTION OF THE DRAWINGS

The present invention will be more clearly understood from the following detailed description of specific representative embodiments thereof, read in conjunction with the accompanying drawings wherein.

DETAILED DESCRIPTION

Figure 1:
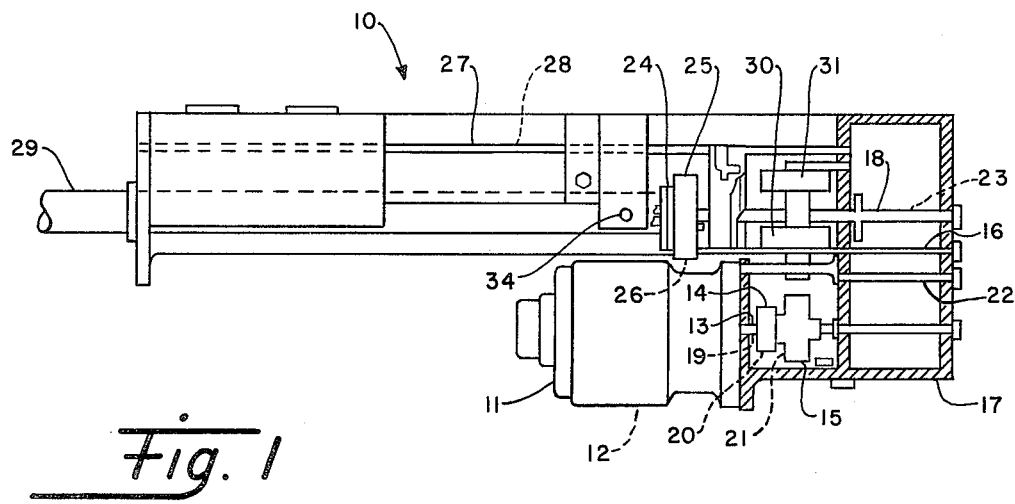
FIG. 1 is a schematic side elevational view of the controller of the present invention with the housing removed to reveal the location of major internal components.

Referring now to the drawings, FIG. 1 shows a schematic side elevational view of the controller 10 of the present invention with the outer casing is part removed to reveal the major internal parts.

Controller 10 employs two servo-mechanical systems for controlling the input to the wheel of a flight simulator, one system for controlling pitch and the other controlling roll, both mechanically interconnected to a single output shaft. Two servo motors 11 and 12 power the controller for providing inputs to the simulator from externally supplied data storage. One servomotor 11 controls inputs related to pitch of the simulator, and a second motor 12 (hidden in FIG. 1) provides input related to roll. In a controller 10 built in demonstration of the invention herein, pitch motor 11 and roll motor 12 each were a one-horsepower electric motor capable of delivering up to 375 lbs and 80 ft-lb at rates, respectively, of 16 in/sec and 32 rpm. The output shaft 13 of pitch motor 11 is connected through a quick disconnect 14, torque limiter 15, and a gear mesh and pitch idler shaft 16 within housing 17 to screw 18. Shafts 13 and 16 and screw 18 are conventionally journaled into the gear housing 17 through bearings (not shown). The shaft 19 (shown hidden in FIG. 1) of roll motor 12 is connected through a quick disconnect 20, torque limiter 21 and gear mesh and roll reduction shaft 22 to ball spline 23 mounted parallel to screw 18. Carriage 24, upon which the pitch and roll inputs are mechanically mixed through gears 25 and 26, is carried within the housing of controller 10 on stationary shaft 27 on the screw 28, pitch motor 11 input side, and on shaft 28 on the spline 23 side. Carriage 24 is interconnected with screw 18 to be advanced along shafts 27 and 28 upon inputs by pitch motor 11. Carriage 24 supports output shaft 29 and inparts axial movement thereto upon advancement of screw 18.

Transducer 30, mounted near screw 18 and operatively interconnected therewith, senses the axial displacement of screw 18, carriage 24 and output shaft 29. Similarly, transducer 31 mounted near spline 23 and operatively connected thereto, senses the angular position of spline 23 (and output shaft 29 by reason of the interconnection thereof through the gear mesh system of gears 25 and 26). Control of the torque exerted by pitch motor 11 and roll motor 12, respectively, is provided by torque limiters 15 and 21 mounted on shafts 13 and 19. The torque on output shaft 29 is sensed by a separate transducer mounted thereon as discussed below in relation to FIGS. 3 and 4. By sensing both force and position transducers operatively interconnected to the output shaft 29 as described allows the servoloop controlling the operation of pitch motor 11 and roll motor 12 to be closed in response to inputs related to either force or position, or a combination thereof.

Figure 2:
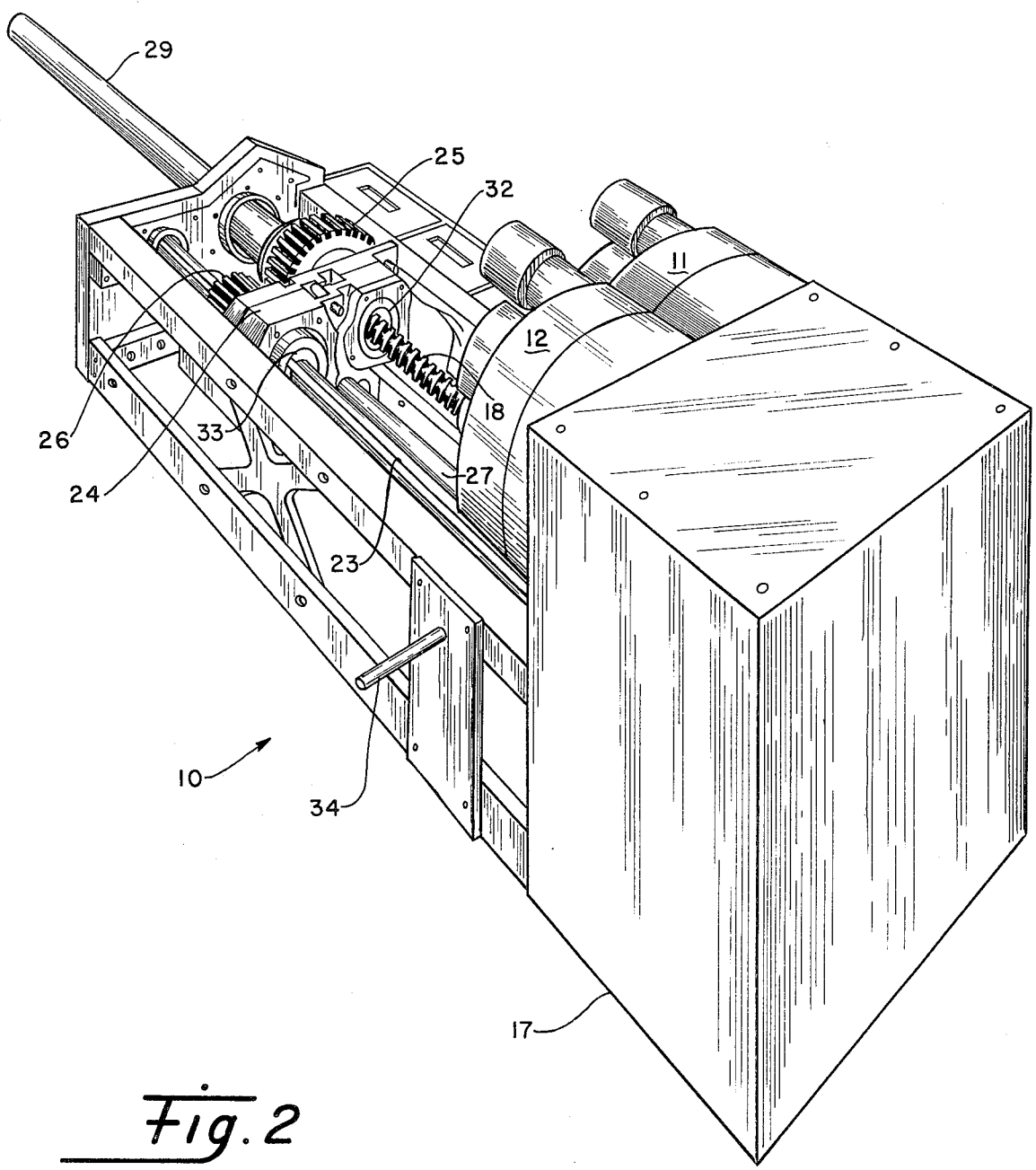
FIG. 2 is a perspective view of the carriage portion of the controller showing the gear mesh configuration for mechanically mixing the pitch and roll inputs to the output shaft.

Reference is now made additionally to FIG. 2, which illustrates a perspective view of the carriage 24 and gear mesh 25, 26 portion of controller 10. For clarity of illustration, FIG. 2 shows the underside of controller 10, i.e., it is shown in a position inverted from that of installation into a flight simulator. The carriage 24 supports separate bearings 32 and 33, respectively, rotatably supporting screw 18 and spline 23 to which the gear mesh comprising gears 25, 26 are operatively interconnected. The gear mesh 25, 26 transfers the spline 23 input to the output shaft 29 of controller 10.

The output shaft 29 travel in the controller 10 demonstration unit was limited to about 20 inches and one revolution, i.e., the input to the wheel of the simulator was approximately ±10 inches wheel travel for pitch input and ±½ revolution for roll input. It is recognized, however, that a controller 10 built according to the teachings hereof would not be so limited, but that, with suitable sizing of the constituent parts, speed and degree of shaft travel, and force thereon may be varied.

Figure 3:
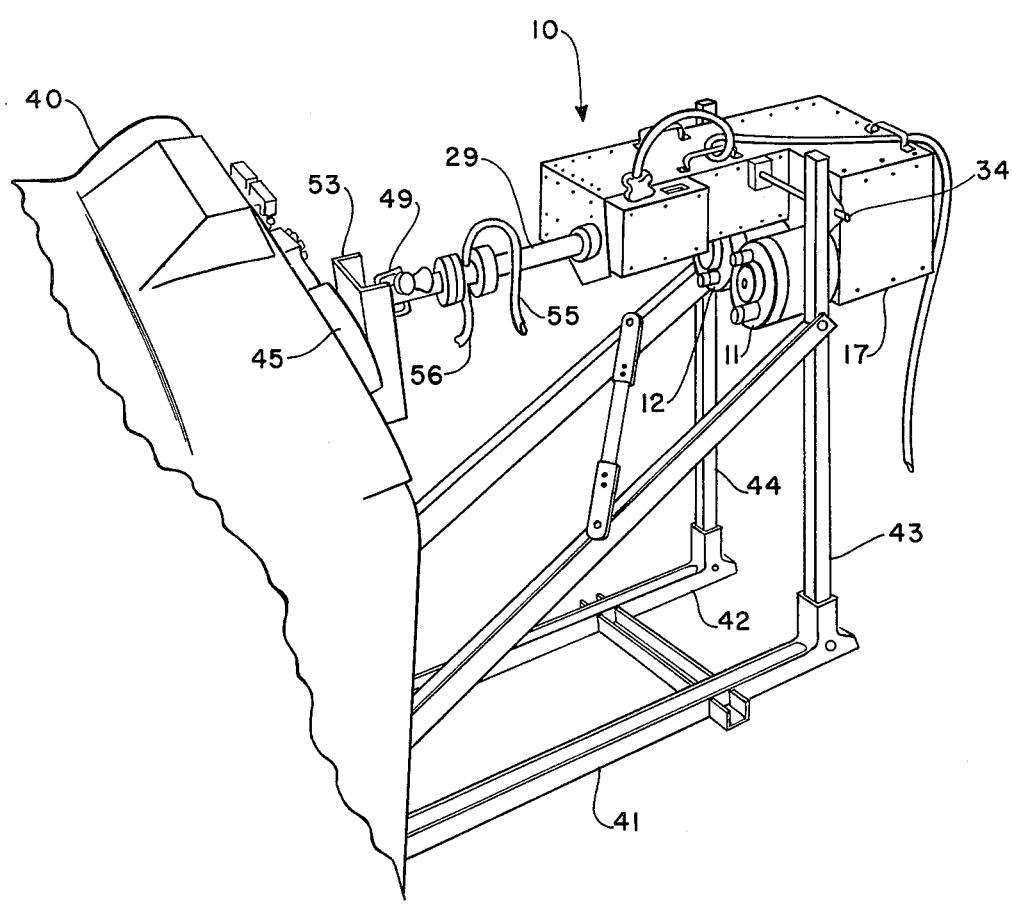
FIG. 3 is a perspective view of part of the interior of a flight simulator showing placement of the controller of the present invention.

Reference is now made to FIG. 3 which is a fragmentary view of the interior of a flight simulator 40 with a controller 10 of the present invention in place. In order to place the controller 10 within flight simulator 40, it is appropriate first to remove the pilot seat therefrom. A pair of channel sections 41, 42 may then be bolted to the simulator floor in place of the seat rails, and a pair of upstanding supports 43, 44 may be secured to sections 41, 42 substantially as shown in FIG. 3. Controller 10 is then pivotally supported on a pair of trunnions 34 journaled into housing 17 of controller 10 (see also FIG. 1). Pivotal mounting of controller 10 through trunnions 34 as described is particularly desirable to allow controller 10 to pivot slightly in response to the arcuate movement of the simulator wheel 45, in order for the output shaft 29 to remain aligned with the wheel 45.

Figure 4:
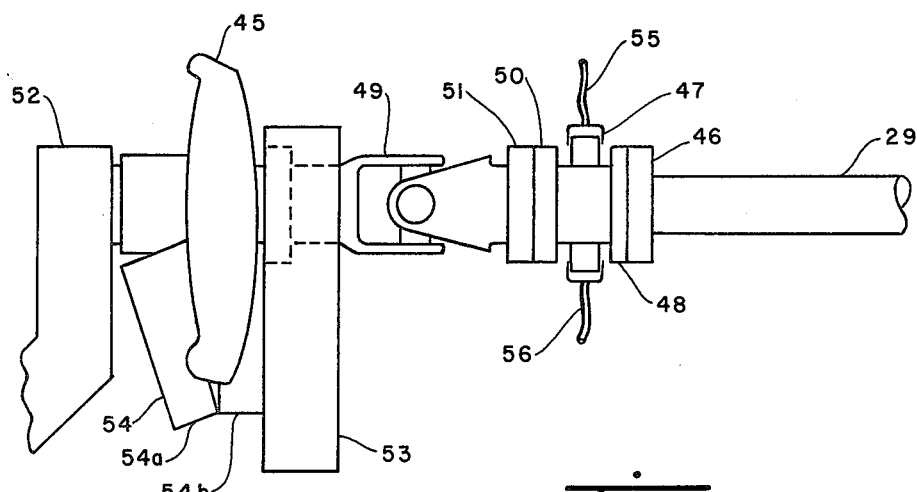
FIG. 4 is a schematic side elevational view of a representative means for interconnecting the output shaft of the controller with the wheel of a flight simulator.

The output shaft 29 of controller 10 is connected to wheel 45 of simulator 40 through the connecting means shown in more detail in the schematic representation of FIG. 4. As shown therein, output shaft 29 of controller 10 terminates at a flange 46 to which one side of a load cell of force sensor 47 is bolted through a mating flange 48. The other side of force sensor 47 is connected to a universal joint 49 through flanges 50 and 51. Universal joint 49 connects the force sensor 47-output shaft 29 assembly to wheel 45 on column 52 of simulator 40 by way of an attaching plate 53 and wheel grip 54. Force sensor 47 may be connected to the associated electronics (not shown) through leads 55 and 56, and provides signals defining both torque and axial load experienced by output shaft 29 and, consequently, that exerted on wheel 45 of simulator 40.

It is highly desirable, in order to provide arcuate, reliable, and reproducible signals to the flight simulator 40, that the controller 10 and wheel 45 be interconnected with substantially no play. To this end, wheel grip 54 may be fabricated for each specific wheel to provide substantial contact with the wheel 45 without bending the wheel 45 of allowing any slippage thereon. In a representative model of the invention fabricated in demonstration hereof, wheel grip 54 was made in two parts 54a, 54b by first applying a mold release agent to the simulator wheel 45 to which the controller 10 was to be interconnected. A desirable portion (such as is suggested in FIG. 4) of the wheel 45 was then wrapped with fiberglass and then treated with epoxy. After the epoxy set, the fiberglass was cut along a desired parting line, and used to mold the two wheel grip sections 54a and 54b, which when bolted together around wheel 45 and to attaching plate 53 provided an acceptably snug connection to wheel 45. Many conventional molding materials for wheel grip 54 would be acceptable; in the demonstration, a wheel grip 54 molded of 20% epoxy and 80% aluminum was used.

The present invention, therefore, provides an improved servo-mechanical controller for inputting prerecorded control commands to the controls of a wheel/-column type flight simulator. It is understood that certain modifications to the invention as hereinabove described may be made, as might occur to one with skill in the field of this invention, within the scope of the appended claims. Therefore, all embodiments and applications thereof contemplated hereunder have not been described in complete detail. Other embodiments may be developed without departing from the spirit of this invention or from the scope of the appended claims.

I claim:

1. A servomechanical controller for inputting electronically prerecorded commands to a flight simulator having a wheel and column type control, comprising:
   a. an output shaft operatively interconnected to said wheel to provide pitch control to said wheel in response to axial movement of said shaft, and roll control to said wheel in response to rotative movement of said shaft;

b. first means, operatively interconnected to said shaft, to impart axial movement to said shaft in response to electronic inputs thereto;

c. second means, operatively interconnected to said shaft to impart rotative movement to said shaft in response to electronic inputs thereto;

d. first transducer means sensing the axial position of said shaft and providing an output signal thereof;

e. second transducer means sensing the angular position of said shaft and providing an output signal thereof;

f. a force sensor for sensing the torque and axial load on said shaft and providing output signals thereof; and g. electrical means operatively interconnecting said first means, second means, first and second transducer means, and force sensor for providing said electronic inputs to said first and second means in response to said electronically prerecorded commands and said output signals.

2. The controller as recited in claim 1 wherein said first and second means comprises servo controlled motors.

* * * * *